Oct. 30, 1923.
W. PERKS ET AL
1,472,308
WOOL AND HAIR BURRING MACHINE
Filed Feb. 5, 1923
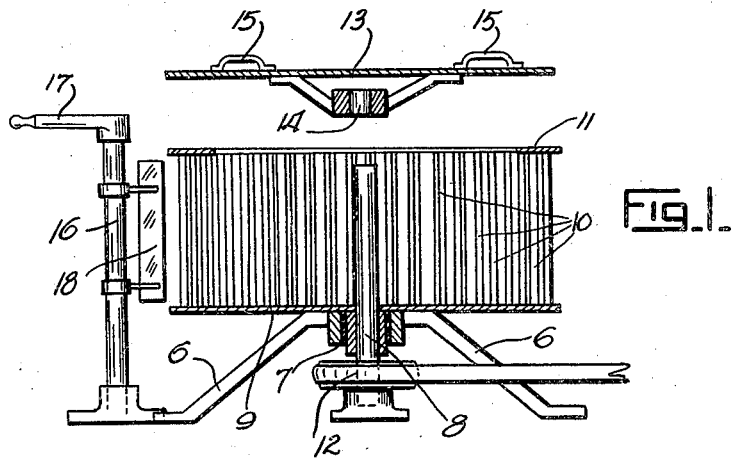
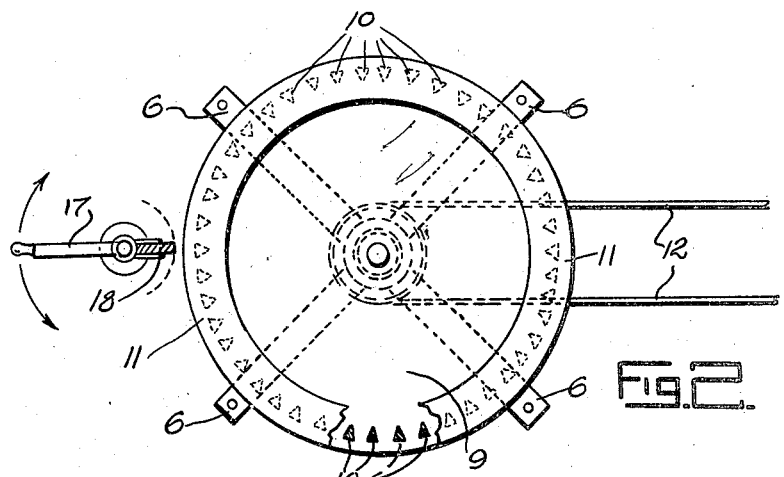
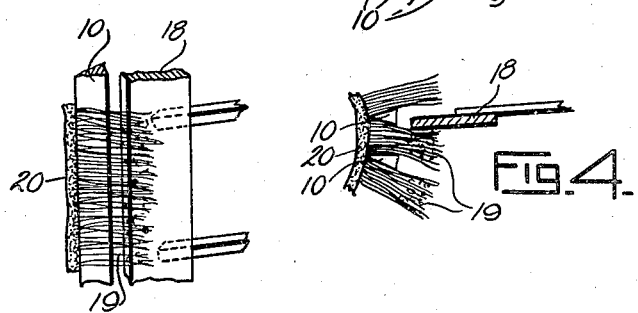
Inventors-
Walter Perks,
David Smith Turner
& John Williamson
By B. Singer. Atty Patented Oct. 30, 1923.

1,472,308

UNITED STATES PATENT OFFICE.

WALTER PERKS, OF ST. PETERS, NEAR SYDNEY, AND DAVID SMITH TURNER AND JOHN WILLIAMSON, OF MARRICKSVILLE, NEAR SYDNEY, NEW SOUTH WALES, AUSTRALIA, ASSIGNORS TO WILLIAMSON DEBURRING CO. LIMITED, OF SYDNEY, NEW SOUTH WALES, AUSTRALIA, A COMPANY OF NEW SOUTH WALES, AUSTRALIA.

WOOL AND HAIR BURRING MACHINE.

Application filed February 5, 1923. Serial No. 617,080.

*To all whom it may concern:*

Be it known that we, WALTER PERKS, a subject of the King of Great Britain, residing at St. Peters, near Sydney, in the State of New South Wales, Commonwealth of Australia, and DAVID SMITH TURNER and JOHN WILLIAMSON, subjects of the King of Great Britain, both residing at Marrickville, near Sydney, New South Wales, have invented certain new and useful Improvements in Wool and Hair Burring Machines, of which the following is a specification.

This invention relates to improvements in machines for removing burrs and other foreign substances adhering to the wool or hair on the skins or hides of animals and is particularly adapted for the removal of burrs from sheep skins, the operation being carried out rapidly and effectively.

According to the invention, we provide a cage or drum within or on which the skin, wool outwards, is secured. On rotation of the cage or drum at high speed, the wool fibres are extended radially when the burrs are removed therefrom by a comb or blade against which they contact. The means employed to retain the skin in or on the cage or drum lie close to the skin on rotation and have the effect of parting the wool into sections. In the cage form, the wool is parted by radial knives or blades, the burred wool being projected between adjacent knives.

But in order that our invention may be more readily understood we now refer to the accompanying sheet of drawings which illustrate a form of machine constructed according to the invention.

Figure 1 is a sectional elevation, and
Figure 2, a plan view thereof.
Figures 3 and 4 are fragmentary elevation and plan views respectively illustrating the deburring or cleaning of the wool or other fibres.

The same numerals indicate the same or corresponding parts throughout the drawings.

On a base 6 is attached the centre bearing 7 in which revolves the vertical shaft or spindle 8 carrying the bottom plate 9 of the cage. Adjacent the periphery of said plate 9 are fixed the lower ends of the blades or knives 10, preferably wedge shaped, the apex of the wedge pointing inwardly. 11 is a ring or top plate in which is rigidly secured the upper ends of the knives or blades. The spindle or shaft 8 is revolved by belt and pulley 12 or the like. 13 is a cover plate provided with a bearing 14 so that when the cover is secured in position, the bearing 14 takes the overhang of the shaft 8. 15 represents handles for removing the cover 13. 16 is a post or pillar which can be turned by the handle 17, and 18 is a burr remover or comb secured to the post 16 so that it can be brought into contact with the wool or other fibres 19 to remove the burrs as shown in Figures 3 and 4, when the cage is being revolved at a high speed.

In operation, the wool or other skin 20 is wire clipped or otherwise secured in the cage, the wool 19 being placed against the knives or blades 10. The cover plate 13 is then secured in position and the cage revolved at a high speed. By centrifugal action the wool fibres 19 are forced between the knives or blades 10 and when fully extended radially the burr remover or comb 18 is moved into contact with the fibres, the impact therewith loosening the matted fibres and removing the burrs leaving the wool clean.

We would have it understood that we do not restrict ourselves to the particular construction illustrated and it is obvious that the skin may be secured on the outside of the cage or drum so long as the fibres are extended radially to enable the comb or other burr remover to contact therewith.

We claim:—

1. In machines for removing burrs and the like from wool or hair on skins, a cylindrical member arranged to be rotated at high speed and having parting members spaced apart peripherally therein, said members having inwardly converging sides, and a burr remover, positioned adjacent the outer periphery of said member, to contact with and remove burrs and the like from the radially extended wool of a skin arranged within and carried by said cylindrical member.

2. In machines for removing burrs and the like from wool or hair on skins, a cylindrical cage adapted to be rotated at high speed, parting members spaced apart peripherally in said cage and a burr removing blade or comb positioned adjacent the periphery of said cage to contact with the wool fibres projected between said parting members.

3. In machines for removing burrs and the like from wool or hair on skins, a high speed rotatable cage, knives or blades peripherally fixed on said cage and spaced apart, and a rotatable pillar positioned outside the cage, said pillar having a comb adapted to be brought into contact with the wool fibres projected beyond the knives.

In testimony whereof we have hereunto set our hands.

WALTER PERKS.
DAVID SMITH TURNER.
JOHN WILLIAMSON.